(12) United States Patent
Maeda

(10) Patent No.: US 12,497,468 B2
(45) Date of Patent: Dec. 16, 2025

(54) POLYVINYL ACETAL RESIN

(71) Applicant: SEKISUI CHEMICAL CO., LTD., Osaka (JP)

(72) Inventor: Takayuki Maeda, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 518 days.

(21) Appl. No.: 18/026,648

(22) PCT Filed: Sep. 24, 2021

(86) PCT No.: PCT/JP2021/034988
§ 371 (c)(1),
(2) Date: Mar. 16, 2023

(87) PCT Pub. No.: WO2022/071089
PCT Pub. Date: Apr. 7, 2022

(65) Prior Publication Data
US 2023/0331879 A1 Oct. 19, 2023

(30) Foreign Application Priority Data
Sep. 30, 2020 (JP) .................................. 2020-166191

(51) Int. Cl.
C08F 16/38 (2006.01)
C08F 8/28 (2006.01)
C08K 3/08 (2006.01)
C08K 5/053 (2006.01)
C09D 129/14 (2006.01)

(52) U.S. Cl.
CPC ............... *C08F 16/38* (2013.01); *C08F 8/28* (2013.01); *C08K 3/08* (2013.01); *C08K 5/053* (2013.01); *C09D 129/14* (2013.01); *C08K 2003/0856* (2013.01)

(58) Field of Classification Search
CPC ................. C08F 16/38; C08F 216/38
See application file for complete search history.

(56) References Cited

U.S. PATENT DOCUMENTS

| | | | |
|---|---|---|---|
| 9,023,930 B2 * | 5/2015 | Ootsuki | H01B 1/22 524/390 |
| 2003/0109636 A1 * | 6/2003 | Miyake | G03C 1/49863 525/61 |
| 2006/0014049 A1 * | 1/2006 | Ichinose | B32B 18/00 428/701 |
| 2007/0117173 A1 * | 5/2007 | Levison | C12P 21/06 435/23 |
| 2013/0148263 A1 * | 6/2013 | Shimazumi | C09D 129/04 361/321.1 |
| 2013/0225741 A1 | 8/2013 | Ootsuki | |
| 2022/0186017 A1 | 6/2022 | Maeda | |

FOREIGN PATENT DOCUMENTS

| | | |
|---|---|---|
| CN | 102924744 | 2/2013 |
| CN | 103124766 | 5/2013 |
| CN | 113646380 | 11/2021 |
| JP | 3043106 | 3/2000 |
| JP | 3110146 | 9/2000 |
| JP | 2004-68013 | 3/2004 |
| JP | 2007-106848 | 4/2007 |
| JP | 2008-37890 | 2/2008 |
| JP | 2012-72326 | 4/2012 |
| JP | 2019-108267 | 7/2019 |
| JP | 2020-132863 | 8/2020 |

OTHER PUBLICATIONS

International Search Report issued Nov. 22, 2021 in International (PCT) Application No. PCT/JP2021/034988.

* cited by examiner

*Primary Examiner* — Robert C Boyle
(74) *Attorney, Agent, or Firm* — Wenderoth, Lind & Ponack, L.L.P.

(57) ABSTRACT

The present invention provides a polyvinyl acetal resin that has an excellent dispersing property and enables the production of a formed article having high mechanical strength. Provided is a polyvinyl acetal resin having a water absorption per unit area of 2 mg/cm$^2$ or greater and 50 mg/cm$^2$ or less when formed into a film having a thickness of 10 μm.

5 Claims, No Drawings

POLYVINYL ACETAL RESIN

TECHNICAL FIELD

The present invention relates to a polyvinyl acetal resin that has an excellent dispersing property and enables the production of a formed article having high mechanical strength.

BACKGROUND ART

Polyvinyl acetal resins are excellent in toughness, film formation, dispersing property for inorganic powder (e.g., pigment) and organic powder, and adhesiveness to surfaces to which the resins are applied. Polyvinyl acetal resins are thus used for applications such as ceramic green sheets and conductive pastes constituting multilayer ceramic capacitors, inks, coating materials, enamels for baking, and wash primers, for example.

In particular, a multilayer ceramic capacitor is typically produced through the following steps.

First, ceramic raw material powder is added to a binder resin such as polyvinyl butyral resin and uniformly mixed to prepare a slurry composition. The obtained slurry composition is applied to a release-treated surface of a support. The composition is subjected to heating or the like to remove solvent and other volatile components, and then separated from the support to provide a ceramic green sheet. Next, the obtained ceramic green sheet is coated with a conductive paste by a method such as screen printing, where the conductive paste contains polyvinyl butyral resin or the like as a binder resin. Sheets obtained in this manner are stacked such that the ceramic green sheets and the conductive paste layers alternate with each other, and thermally pressure-bonded to provide a laminate. After debinding treatment, the laminate is fired, and external electrodes are sintered to the end surfaces of the obtained ceramic fired article. Through these steps, a multilayer ceramic capacitor can be obtained.

Regarding the binder resin, Patent Literature 1 discloses a polyvinyl acetal resin obtained by generating acetic acid from residual sodium acetate in polyvinyl alcohol and acetalizing the polyvinyl alcohol using the obtained acetic acid as a catalyst. Patent Literature 1 discloses that using this polyvinyl acetal resin can prevent metal corrosion of surrounding equipment.

Patent Literature 2 discloses that using a polyvinyl acetal resin obtained by acetalizing a specific modified polyvinyl alcohol with acetaldehyde and butyraldehyde can increase the flexibility and the thermal fusing properties of a sheet obtained from the resin.

CITATION LIST

Patent Literature

Patent Literature 1: JP 3043106 B
Patent Literature 2: JP 3110146 B

SUMMARY OF INVENTION

Technical Problem

However, for example, magnetic material powder such as ferrite powder is poorly dispersible. Using the polyvinyl acetal resin of Patent Literature 1 or 2 as a binder resin may cause magnetic material powder to insufficiently disperse or to settle over time in the slurry composition. There is thus room for improvement in dispersing property and dispersion stability. Moreover, a sheet formed using such a slurry composition may have low mechanical strength and cause defects during processing of the formed sheet.

The present invention aims to provide a polyvinyl acetal resin that has an excellent dispersing property and enables the production of a formed article having high mechanical strength.

Solution to Problem

The present invention relates to a polyvinyl acetal resin having a water absorption per unit area of 2 mg/cm$^2$ or greater and 50 mg/cm$^2$ or less when formed into a film having a thickness of 10 μm.

The present invention is described in detail below.

As a result of intensive studies, the present inventor has found out that adjusting the water absorption per unit area under predetermined conditions can improve the dispersing property for hard-to-disperse materials such as magnetic material powder and make it possible to produce a film having high mechanical strength. The inventor thus completed the present invention. The present invention can also achieve high adhesiveness to substrates.

The polyvinyl acetal resin of the present invention has a water absorption per unit area of 2 mg/cm$^2$ or greater and 50 mg/cm$^2$ or less when formed into a film having a thickness of 10 μm. The water absorption per unit area within the above range allows an excellent ferrite dispersing property and improved strength of the resulting sheet. The lower limit of the water absorption per unit area is preferably 3 mg/cm$^2$, and the upper limit thereof is preferably 40 mg/cm$^2$, more preferably 30 mg/cm$^2$.

The water absorption per unit area can be calculated by the following method.

Specifically, the polyvinyl acetal resin of the present invention is formed into a film having a thickness of 10 μm, dried at 70° C. for three hours, and then left to stand in an environment at a temperature of 20° C. and a humidity of 55% for one hour or longer. A weight A of the film is then measured. Subsequently, a main surface of the dried formed film is exposed to warm water vapor having a temperature of 50° C. Exposure to water vapor is terminated when waterdrops appear on the surface of the film. A weight B of the formed film is then measured. The water absorption can be calculated by subtracting the weight A from the weight B. The water absorption per unit area is calculated by dividing the water absorption by the exposed area. Herein, the vapor density in the state in which waterdrops appear on a surface of the film is regarded as saturated vapor density.

The polyvinyl acetal resin of the present invention preferably has a water absorption rate of 0.2 mg/min or greater and 4.2 mg/min or less under the measurement conditions for the water absorption per unit area. When the water absorption rate is within the above range, high sheet strength can be obtained. The lower limit of the water absorption rate is more preferably 0.3 mg/min, and the upper limit thereof is more preferably 4.0 mg/min.

The water absorption rate can be measured by the same method as for the water absorption per unit area. Specifically, the time from the start to the termination of the exposure to water vapor is measured. The value of the weight of the film per unit area divided by the exposure time is used as the water absorption rate.

In the present invention, the polyvinyl acetal resin that has a water absorption per unit area within the predetermined range when formed into a film having a thickness of 10 μm can be produced by adjusting factors such as the degree of saponification, the average degree of polymerization, and the hydroxy group half-width of the polyvinyl alcohol as a raw material and acetalization conditions. The polyvinyl acetal resin that has a water absorption per unit area within the predetermined range when formed into a film having a thickness of 10 μm can also be produced by adjusting the hydroxy group content of the polyvinyl acetal resin, the hydroxy group half-width of the polyvinyl acetal resin quantified by IR measurement, and the hydroxy group half-width of the polyvinyl acetal resin in terms of mol % quantified by NMR measurement and IR measurement.

The polyvinyl acetal resin of the present invention preferably contains at least a hydroxy group-containing structural unit represented by the following formula (1), an acetal group-containing structural unit represented by the following formula (2), and an acetyl group-containing structural unit represented by the following formula (3).

[Chem. 1]

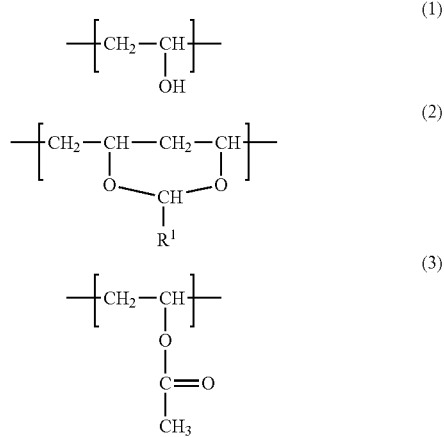

In the formula (2), $R^1$ represents a hydrogen atom or a C1-C20 alkyl group.

When $R^1$ in the formula (2) is a C1-C20 alkyl group, examples of the alkyl group include methyl, ethyl, n-propyl, isopropyl, n-butyl, iso-butyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl groups. Preferred among these are methyl and n-propyl groups.

In the polyvinyl acetal resin of the present invention, the lower limit of the amount of the hydroxy group-containing structural unit represented by the formula (1) (hereinafter also referred to as a "hydroxy group content") is preferably 35 mol %, and the upper limit thereof is preferably 85 mol %. The hydroxy group content not lower than the lower limit makes it easy to adjust the water absorption per unit area to be within the predetermined range. As a result, a slurry composition obtained from the polyvinyl acetal resin of the present invention can have an excellent dispersing property and dispersion stability. Moreover, the resulting formed article can have improved mechanical strength and improved adhesiveness to substrates.

The hydroxy group content can be measured by $^{13}$C-NMR, for example.

In the polyvinyl acetal resin of the present invention, the lower limit of the hydroxy group half-width quantified by IR measurement is preferably 280 cm$^{-1}$, more preferably 290 cm$^{-1}$, and the upper limit thereof is preferably 420 cm$^{-1}$, more preferably 400 cm$^{-1}$. The hydroxy group half-width within the above range makes it easy to adjust the water absorption per unit area to be within the predetermined range. As a result, a slurry composition obtained from the polyvinyl acetal resin of the present invention can have an excellent dispersing property and dispersion stability. Moreover, the resulting formed article can have improved mechanical strength and improved adhesiveness to substrates.

The polyvinyl acetal resin preferably has a hydroxy group half-width in terms of mol % of 0.01 mol %/cm$^{-1}$ or greater and 0.30 mol %/cm$^{-1}$ or less as determined by NMR measurement and IR measurement. When the hydroxy group half-width in terms of mol % is within the above range, the resulting ceramic green sheet can have high mechanical strength and can be less susceptible to appearance defects after cutting or dimensional changes after drying. The hydroxy group half-width in terms of mol % is more preferably 0.05 mol %/cm$^{-1}$ or greater and 0.290 mol %/cm$^{-1}$ or less.

The IR measurement refers to measurement of an absorption spectrum by infrared absorption spectroscopy, and can be performed with an IR measurement device, for example.

The hydroxy group half-width in terms of mol % can be calculated by measuring the hydroxy group half-width from the peak width at half the height of a peak appearing near 3,500 cm$^{-1}$ in the IR measurement, then measuring the hydroxy group content by NMR measurement, and dividing the hydroxy group content by the hydroxy group half-width.

In the polyvinyl acetal resin of the present invention, the lower limit of the amount of the acetal group-containing structural unit represented by the formula (2) (hereinafter also referred to as an "acetal group content") is preferably 1 mol %, and the upper limit thereof is preferably 50 mol %.

The acetal group content within the above range can enhance the toughness of the resin.

The lower limit of the acetal group content is more preferably 2 mol %, and the upper limit thereof is more preferably 45 mol %.

The acetal group content herein is calculated by counting acetalized two hydroxy groups because an acetal group of a polyvinyl acetal resin is obtained by acetalizing two hydroxy groups.

The acetal group content can be measured by NMR, for example.

In the formula (2), $R^1$ is preferably a methyl group or a propyl group.

When $R^1$ in the formula (2) is a methyl group, the polyvinyl acetal resin of the present invention preferably has an acetal group content (acetoacetal group content) of 1 mol % or greater and 50 mol % or less.

When $R^1$ in the formula (2) is a propyl group, the polyvinyl acetal resin of the present invention preferably has an acetal group content (butyral group content) of 1 mol % or greater and 10 mol % or less. The acetal group content within the above range allows high water absorption.

In the polyvinyl acetal resin of the present invention, the lower limit of the amount of the acetyl group-containing structural unit represented by the formula (3) (hereinafter also referred to as an "acetyl group content") is preferably 1 mol %, and the upper limit thereof is preferably 20 mol %.

The acetyl group content within the above range can enhance the toughness of the resin.

The lower limit of the acetyl group content is more preferably 2 mol %, and the upper limit thereof is more preferably 15 mol %.

The acetyl group content can be measured by NMR, for example.

The polyvinyl acetal resin of the present invention may contain a structural unit containing an acid-modified group.

Examples of the acid-modified group include carboxyl, sulfonic acid, maleic acid, sulfinic acid, sulfenic acid, phosphoric acid, phosphonic acid, and amino groups, and salts thereof. Preferred among these is a carboxyl group.

The modified polyvinyl acetal resin having the structural unit containing an acid-modified group has better compatibility with an epoxy resin to achieve high mechanical strength.

The structural unit containing an acid-modified group may have a structure in which an acid-modified group as a side chain is directly bonded to a carbon atom constituting the main chain or a structure in which an acid-modified group as a side chain is bonded to a carbon atom constituting the main chain via an alkylene group.

The structural unit containing an acid-modified group may have a steric structure in which two acid-modified groups are bonded to the same carbon atom constituting the main chain or a steric structure in which one acid-modified group is bonded to a carbon atom constituting the main chain. Alternatively, the structural unit containing an acid-modified group may have a steric structure in which one acid-modified group is bonded to each of two adjacent carbon atoms constituting the main chain or a steric structure in which an acid-modified group is bonded to only one of two adjacent carbon atoms constituting the main chain. A preferred structure is a steric structure in which two acid-modified groups are bonded to the same carbon atom constituting the main chain or a steric structure in which one acid-modified group is bonded to each of two adjacent carbon atoms constituting the main chain. A more preferred structure is a steric structure in which two acid-modified groups are bonded to the same carbon atom constituting the main chain, because such a structure increases the steric hindrance and thereby widens the network structure of a cured product obtainable by combining the polyvinyl acetal resin and an epoxy resin, and as a result can improve the flexibility of the cured product to be obtained.

The structural unit containing an acid-modified group may have a steric structure in which acid-modified groups are bonded to carbon atoms constituting the main chain on one side (isotactic arrangement) or a steric structure in which acid-modified groups are bonded to carbon atoms constituting the main chain at alternate positions along the chain (syndiotactic arrangement). The structural unit may have a steric structure in which the acid-modified groups are randomly bonded (atactic arrangement).

In the case where the structural unit containing an acid-modified group has a structure in which an acid-modified group is bonded to a carbon atom constituting the main chain via an alkylene group, the alkylene group is preferably a C1-C10 alkylene group, more preferably a C1-C5 alkylene group, still more preferably a C1-C3 alkylene group.

Examples of the C1-C10 alkylene group include linear alkylene groups, branched alkylene groups, and cyclic alkylene groups.

Examples of the linear alkylene groups include methylene, vinylene, n-propylene, tetramethylene, pentamethylene, hexamethylene, octamethylene, and decamethylene groups.

Examples of the branched alkylene groups include methyl methylene, methyl ethylene, 1-methyl pentylene, and 1,4-dimethyl butylene groups.

Examples of the cyclic alkylene groups include cyclopropylene, cyclobutylene, and cyclohexylene groups.

Preferred among these are linear alkylene groups, more preferred are methylene, vinylene, and n-propylene groups, and still more preferred are methylene and vinylene groups.

The lower limit of the average degree of polymerization of the polyvinyl acetal resin of the present invention is preferably 200, and the upper limit thereof is preferably 5,000. The average degree of polymerization within the above range allows the resulting coating film to have sufficiently high mechanical strength.

The lower limit of the average degree of polymerization is more preferably 300, and the upper limit thereof is more preferably 4,000.

The polyvinyl acetal resin of the present invention may be produced by, for example, a method including polymerizing a monomer such as vinyl acetate to prepare a polyvinyl acetate resin, saponifying the polyvinyl acetate resin by adding an acid or alkali, and acetalizing the resulting polyvinyl alcohol resin.

In the present invention, the polyvinyl acetal resin that has a water absorption per unit area within the predetermined range when formed into a film having a thickness of 10 µm can be produced by acetalizing a polyvinyl alcohol having a degree of saponification, an average degree of polymerization, and a hydroxy group half-width within predetermined ranges. For example, the polyvinyl alcohol resin preferably has a hydroxy group half-width of 340 $cm^{-1}$ or greater and 380 $cm^{-1}$ or less.

The polyvinyl alcohol resin preferably has an average degree of polymerization of 200 or greater and 5,000 or less and preferably has a degree of saponification of 70 mol % or greater and 99.9 mol % or less.

The polyvinyl acetal resin of the present invention is particularly preferably an acetalized product of a polyvinyl alcohol resin having a degree of saponification of 75 mol % or greater.

Here, such a specific polyvinyl alcohol can be provided by, for example, choosing a polyvinyl alcohol based on measurement of the physical properties of multiple types of polyvinyl alcohols, choosing a polyvinyl alcohol from commercial polyvinyl alcohols by referring to provided information about their physical properties, or synthesizing a polyvinyl alcohol with adjusted physical properties in predetermined processes.

The acetalization may be carried out by a known method and is preferably carried out in a water solvent, a solvent mixture containing water and an organic solvent compatible with water, or an organic solvent.

The organic solvent compatible with water may be, for example, an alcoholic organic solvent.

Examples of the organic solvent include alcoholic organic solvents, aromatic organic solvents, aliphatic ester solvents, ketone solvents, lower paraffin solvents, ether solvents, amide solvents, and amine solvents.

Examples of the alcoholic organic solvents include methanol, ethanol, n-propanol, isopropanol, n-butanol, and tert-butanol.

Examples of the aromatic organic solvents include xylene, toluene, ethyl benzene, and methyl benzoate.

Examples of the aliphatic ester solvents include methyl acetate, ethyl acetate, butyl acetate, methyl propionate, ethyl propionate, methyl butyrate, ethyl butyrate, methyl acetoacetate, and ethyl acetoacetate.

Examples of the ketone solvents include acetone, methyl ethyl ketone, methyl isobutyl ketone, cyclohexanone, methyl cyclohexanone, benzophenone, and acetophenone.

Examples of the lower paraffin solvents include hexane, pentane, octane, cyclohexane, and decane.

Examples of the ether solvents include diethyl ether, tetrahydrofuran, ethylene glycol dimethyl ether, ethylene glycol diethyl ether, and propylene glycol diethyl ether.

Examples of the amide solvents include N,N-dimethylformamide, N,N-dimethylacetamide, N-methylpyrrolidone, and acetanilide.

Examples of the amine solvents include ammonia, trimethylamine, triethylamine, n-butylamine, di-n-butylamine, tri-n-butylamine, aniline, N-methylaniline, N,N-dimethylaniline, and pyridine.

These may be used alone or in admixture of two or more thereof. From the standpoint of the ability to dissolve resin and easy purification, particularly preferred among these are ethanol, n-propanol, isopropanol, and tetrahydrofuran.

The acetalization is preferably carried out in the presence of an acid catalyst.

The acid catalyst is not limited, and examples thereof include mineral acids such as sulfuric acid, hydrochloric acid, nitric acid, and phosphoric acid, carboxylic acids such as formic acid, acetic acid, and propionic acid, and sulfonic acids such as methanesulfonic acid, ethanesulfonic acid, benzenesulfonic acid, and p-toluenesulfonic acid. These acid catalysts may be used alone, or two or more types of compounds may be used in combination. Preferred among these are hydrochloric acid, nitric acid, and sulfuric acid, and particularly preferred is hydrochloric acid.

The aldehyde used for the acetalization may be an aldehyde having a C1-C10 chain aliphatic group, a C1-C10 cyclic aliphatic group, or a C1-C10 aromatic group. The aldehyde used may be a conventionally known aldehyde. The aldehyde used for the acetalization reaction is not limited, and examples thereof include aliphatic aldehydes and aromatic aldehydes.

Examples of the aliphatic aldehydes include formaldehyde, acetaldehyde, propionaldehyde, n-butyraldehyde, isobutyraldehyde, n-valeraldehyde, n-hexylaldehyde, 2-ethylbutyraldehyde, 2-ethylhexylaldehyde, n-heptylaldehyde, n-octylaldehyde, n-nonylaldehyde, n-decylaldehyde, and amylaldehyde.

Examples of the aromatic aldehydes include aromatic aldehydes such as benzaldehyde, cinnamaldehyde, 2-methylbenzaldehyde, 3-methylbenzaldehyde, 4-methylbenzaldehyde, p-hydroxybenzaldehyde, m-hydroxybenzaldehyde, phenylacetaldehyde, and β-phenylpropionaldehyde.

Cyclic multimers such as paraldehyde and metaldehyde may also be used.

These aldehydes may be used alone, or two or more types thereof may be used in combination. Preferred among these aldehydes are formaldehyde, acetaldehyde, butyraldehyde, 2-ethylhexylaldehyde, n-nonylaldehyde, and paraldehyde because they have excellent acetalization reactivity and can give a sufficient internal plasticization effect and in turn favorable flexibility to the resulting resin. More preferred are formaldehyde, acetaldehyde, butyraldehyde, and paraldehyde because an adhesive composition particularly excellent in impact resistance and adhesiveness to metal can be obtained.

The amount of the aldehyde to be added can be appropriately determined according to the acetal group content of the aimed polyvinyl acetal resin. In particular, the amount may be 60 to 95 mol %, preferably 65 to 90 mol % relative to 100 mol % of the polyvinyl alcohol. The amount in the range is preferred because the acetalization reaction can be efficiently carried out and unreacted aldehyde can be easily removed.

By mixing the polyvinyl acetal resin of the present invention with magnetic material powder, a solvent, and the like, a slurry composition can be produced. The present invention encompasses a slurry composition containing the polyvinyl acetal resin of the present invention, magnetic material powder, and a solvent.

The lower limit of the amount of the polyvinyl acetal resin of the present invention in the slurry composition of the present invention is 20% by weight, more preferably 25% by weight, and the upper limit thereof is preferably 65% by weight, more preferably 60% by weight.

The slurry composition of the present invention contains magnetic material powder.

Examples of the magnetic material powder include metal particles, metal oxide particles, and metal nitride particles.

Examples of metal particles used as the magnetic material powder include particles containing iron, particles containing cobalt, particles containing nickel, and particles containing alloys containing these metals.

Examples of the alloys include Fe—Ni, Fe—Co, Fe—Cr, Fe—Si, Fe—Al, Fe—Cr—Si, Fe—Cr—Al, Fe—Al—Si, and Fe—Pt.

The metal oxide is preferably ferrite. Specific examples thereof include $MnFe_2O_4$, $CoFe_2O_4$, $NiFe_2O_4$, $CuFe_2O_4$, $ZnFe_2O_4$, $MgFe_2O_4$, $Fe_3O_4$, $MnFe_2O_4$, Cu—Zn ferrite, Ni—Zn ferrite, Mn—Zn-ferrite, Ba ferrite, and Ni—Cu—Zn ferrite.

Examples of the metal nitride include $Fe_2N$, $Fe_3N$, $Fe_4N$, $Fe_{16}N_2$, and $Sm_2Fe_{17}N_3$.

The magnetic material powder may be, for example, spherical, elliptic, disc-shaped, needle-shaped, bar-shaped, flat, tetrapod-shaped, perforated, or porous. In particular, the magnetic material powder is preferably spherical from the standpoint of dispersion and the like.

The magnetic material powder may be surface-treated with a silane coupling agent. Surface treatment of the magnetic material powder with a silane coupling agent can prevent or reduce aggregation of the magnetic material powder when a large amount of the magnetic material powder is compounded.

Examples of the silane coupling agent include aminosilanes such as N-phenyl-3-aminopropyltrimethoxysilane, 3-aminopropyltrimethoxysilane, 3-aminopropyltriethoxysilane, 3-(2-aminoethyl)aminopropyltrimethoxysilane, 3-(2-aminoethyl)aminopropylmethyldimethoxysilane, and 3-(2-aminoethyl)aminopropyltriethoxysilane, vinylsilanes such as vinyltrimethoxysilane, vinyltriethoxysilane, and vinyltriacetoxysilane, methacrylic silanes such as 3-methacryloxypropyltrimethoxysilane and 3-methacryloxypropylmethyldimethoxysilane, mercaptosilanes such as 3-mercaptopropyltrimethoxysilane, 3-mercaptopropylmethyldimethoxysilane, and 3-mercaptopropylethoxysilane, epoxysilanes such as 3-glycidoxypropyltrimethoxysilane, 3-glycidoxypropylmethyldimethoxysilane, 3-glycidoxypropyltriethoxysilane, and 3-glycidoxypropylmethyldiethoxysilane, ureidosilanes such as 3-ureidopropyltriethoxysilane, isocyanate silanes such as 3-isocyanatepropyltrimethoxysilane and 3-isocyanatepropyltriethoxysilane, alkylsilanes such as methyltrimethoxysilane, dimethyldimethoxysilane, trimethylmethoxysilane, ethyltrimethoxysilane, n-propyltrimethoxysilane, isopropyldimethoxysilane, isobutyltrimethoxysilane, and cyclohexylmethyldimethoxysilane, and phenyltrimethoxysilane.

Examples of the method for surface-treating the magnetic material powder with a silane coupling agent include a wet method in which the magnetic material powder is treated in a solution in which the magnetic material powder is dispersed, a dry method in which the magnetic material powder is directly treated as powder, and an integral blend method in which the magnetic material powder is treated in a resin composition in which the magnetic material powder is dispersed in a resin. In particular, a wet method is preferred to prevent or reduce aggregation of the magnetic material powder.

The lower limit of the average particle size of the magnetic material powder is preferably 0.1 µm, and the upper limit thereof is preferably 100 µm.

The magnetic material powder having an average particle size within the above range can further improve the adhesiveness to substrates.

The lower limit of the average particle size of the magnetic material powder is more preferably 0.5 µm, and the upper limit thereof is more preferably 70 µm.

The average particle size can be measured by a laser diffraction-type particle size distribution analyzer, for example.

The lower limit of the amount of the magnetic material powder in the slurry composition of the present invention is preferably 5% by weight, more preferably 10% by weight, and the upper limit thereof is preferably 40% by weight, more preferably 35% by weight.

The solvent may be water or an organic solvent compatible with water as described above.

Examples of the organic solvent compatible with water include alcohols.

The slurry composition of the present invention may contain a resin other than the polyvinyl acetal resin, such as acrylic resin or ethylcellulose as far as it does not impair the effects of the present invention.

The slurry composition of the present invention may further contain a plasticizer, a lubricant, an antistatic agent, and/or the like as far as it does not impair the effects of the present invention.

Advantageous Effects of Invention

The present invention can provide a polyvinyl acetal resin that has an excellent dispersing property and enables the production of a formed article having high mechanical strength.

DESCRIPTION OF EMBODIMENTS

The present invention is more specifically described in the following with reference to, but not limited to, examples.

Example 1

(Production of Polyvinyl Acetal Resin)

An amount of 500 g of a polyvinyl alcohol resin (degree of saponification 88 mol %, average degree of polymerization 600, hydroxy group half-width 350 cm$^{-1}$) was added to 2,500 g of pure water and stirred at a temperature of 90° C. for about two hours for dissolution. This solution was cooled to 40° C. To the solution was added 10 g of hydrochloric acid having a concentration of 35% by weight. The solution temperature was cooled to 5° C., and 75 g of acetaldehyde was added. This temperature was maintained to perform acetalization reaction. The solution was then maintained at a solution temperature of 65° C. for five hours to complete the reaction, and 40 g of an aqueous sodium hydroxide solution was added for neutralization reaction, whereby a polyvinyl acetal resin was obtained.

The obtained polyvinyl acetal resin was subjected to $^{13}$C-NMR (nuclear magnetic resonance spectroscopy) to measure the acetal group content (acetoacetal group content, butyral group content), the hydroxy group content, and the acetyl group content.

The obtained polyvinyl acetal resin was also subjected to IR measurement using HORIBA FT-720 (produced by Horiba, Ltd.) to measure the hydroxy group half-width. Table 1 shows the results.

After the measurement of the hydroxy group half-width, the hydroxy group content measured by $^{13}$C-NMR was divided by the hydroxy group half-width to calculate the hydroxy group half-width in terms of mol %.

Example 2

A polyvinyl acetal resin was obtained as in Example 1 except that a polyvinyl alcohol resin (degree of saponification 88 mol %, average degree of polymerization 600, hydroxy group half-width 345 cm$^{-1}$) was used. The measurements performed as in Example 1 showed that the acetal group content (acetoacetal group content, butyral group content), the hydroxy group content, the acetyl group content, the hydroxy group half-width, and the hydroxy group half-width in terms of mol % were as shown in Table 1.

Example 3

A polyvinyl acetal resin was obtained as in Example 1 except that a polyvinyl alcohol resin (degree of saponification 88 mol %, average degree of polymerization 600, hydroxy group half-width 345 cm$^{-1}$) was used, and that the amount of acetaldehyde added was changed to 7.0 g. The measurements performed as in Example 1 showed that the acetal group content (acetoacetal group content, butyral group content), the hydroxy group content, the acetyl group content, the hydroxy group half-width, and the hydroxy group half-width in terms of mol % were as shown in Table 1.

Example 4

A polyvinyl acetal resin was obtained as in Example 1 except that a polyvinyl alcohol resin (degree of saponification 88 mol %, average degree of polymerization 600, hydroxy group half-width 380 cm$^{-1}$) was used, and that 15.0 g of butyraldehyde was added instead of acetaldehyde. The measurements performed as in Example 1 showed that the acetal group content (acetoacetal group content, butyral group content), the hydroxy group content, the acetyl group content, the hydroxy group half-width, and the hydroxy group half-width in terms of mol % were as shown in Table 1.

Example 5

A polyvinyl acetal resin was obtained as in Example 1 except that a polyvinyl alcohol resin (degree of saponification 88 mol %, average degree of polymerization 600, hydroxy group half-width 370 cm$^{-1}$) was used, and that the amount of acetaldehyde added was changed to 110 g. The measurements performed as in Example 1 showed that the acetal group content (acetoacetal group content, butyral group content), the hydroxy group content, the acetyl group content, the hydroxy group half-width, and the hydroxy group half-width in terms of mol % were as shown in Table 1.

Example 6

A polyvinyl acetal resin was obtained as in Example 1 except that a polyvinyl alcohol resin (degree of saponification 90 mol %, average degree of polymerization 600, hydroxy group half-width 335 cm$^{-1}$) was used, and that the amount of acetaldehyde added was changed to 7.0 g. The measurements performed as in Example 1 showed that the acetal group content (acetoacetal group content, butyral group content), the hydroxy group content, the acetyl group content, the hydroxy group half-width, and the hydroxy group half-width in terms of mol % were as shown in Table 1.

Example 7

A polyvinyl acetal resin was obtained as in Example 1 except that a polyvinyl alcohol resin (degree of saponification 90 mol %, average degree of polymerization 4,500, hydroxy group half-width 345 cm$^{-1}$) was used, and that the amount of acetaldehyde added was changed to 75 g. The measurements performed as in Example 1 showed that the acetal group content (acetoacetal group content, butyral group content), the hydroxy group content, the acetyl group content, the hydroxy group half-width, and the hydroxy group half-width in terms of mol % were as shown in Table 1.

Example 8

A polyvinyl acetal resin was obtained as in Example 1 except that a polyvinyl alcohol resin (degree of saponification 88 mol %, average degree of polymerization 600, hydroxy group half-width 345 cm$^{-1}$) was used, and that the amount of acetaldehyde added was changed to 115 g. The measurements performed as in Example 1 showed that the acetal group content (acetoacetal group content, butyral group content), the hydroxy group content, the acetyl group content, the hydroxy group half-width, and the hydroxy group half-width in terms of mol % were as shown in Table 1.

Example 9

A polyvinyl acetal resin was obtained as in Example 1 except that a polyvinyl alcohol resin (degree of saponification 95 mol %, average degree of polymerization 600, hydroxy group half-width 345 cm$^{-1}$) was used, and that the amount of acetaldehyde added was changed to 110 g. The measurements performed as in Example 1 showed that the acetal group content (acetoacetal group content, butyral group content), the hydroxy group content, the acetyl group content, the hydroxy group half-width, and the hydroxy group half-width in terms of mol % were as shown in Table 1.

Example 10

A polyvinyl acetal resin was obtained as in Example 1 except that a polyvinyl alcohol resin (degree of saponification 82 mol %, average degree of polymerization 600, hydroxy group half-width 345 cm$^{-1}$) was used, and that the amount of acetaldehyde added was changed to 60 g. The measurements performed as in Example 1 showed that the acetal group content (acetoacetal group content, butyral group content), the hydroxy group content, the acetyl group content, the hydroxy group half-width, and the hydroxy group half-width in terms of mol % were as shown in Table 1.

Comparative Example 1

A polyvinyl acetal resin was obtained as in Example 1 except that a polyvinyl alcohol resin (degree of saponification 88 mol %, average degree of polymerization 600, hydroxy group half-width 335 cm$^{-1}$) was used. The measurements performed as in Example 1 showed that the acetal group content (acetoacetal group content, butyral group content), the hydroxy group content, the acetyl group content, the hydroxy group half-width, and the hydroxy group half-width in terms of mol % were as shown in Table 1.

Comparative Example 2

A polyvinyl acetal resin was obtained as in Example 1 except that a polyvinyl alcohol resin (degree of saponification 88 mol %, average degree of polymerization 600, hydroxy group half-width 335 cm$^{-1}$) was used, and that the amount of acetaldehyde added was changed to 140 g. The measurements performed as in Example 1 showed that the acetal group content (acetoacetal group content, butyral group content), the hydroxy group content, the acetyl group content, the hydroxy group half-width, and the hydroxy group half-width in terms of mol % were as shown in Table 1.

Comparative Example 3

A polyvinyl acetal resin was obtained as in Example 1 except that a polyvinyl alcohol resin (degree of saponification 88 mol %, average degree of polymerization 600, hydroxy group half-width 335 cm$^{-1}$) was used, and that the amount of acetaldehyde added was changed to 5 g. The measurements performed as in Example 1 showed that the acetal group content (acetoacetal group content, butyral group content), the hydroxy group content, the acetyl group content, the hydroxy group half-width, and the hydroxy group half-width in terms of mol % were as shown in Table 1.

Comparative Example 4

A polyvinyl acetal resin was obtained as in Example 1 except that a polyvinyl alcohol resin (degree of saponification 92 mol %, average degree of polymerization 600, hydroxy group half-width 345 cm$^{-1}$) was used, and that the amount of acetaldehyde added was changed to 6 g. The measurements performed as in Example 1 showed that the acetal group content (acetoacetal group content, butyral group content), the hydroxy group content, the acetyl group content, the hydroxy group half-width, and the hydroxy group half-width in terms of mol % were as shown in Table 1.

Comparative Example 5

A polyvinyl acetal resin was obtained as in Example 1 except that a polyvinyl alcohol resin (degree of saponification 90 mol %, average degree of polymerization 600, hydroxy group half-width 470 cm$^{-1}$) was used, and that the amount of acetaldehyde added was changed to 75 g. The measurements performed as in Example 1 showed that the acetal group content (acetoacetal group content, butyral group content), the hydroxy group content, the acetyl group content, the hydroxy group half-width, and the hydroxy group half-width in terms of mol % were as shown in Table 1.

<Evaluation>

The polyvinyl acetal resins obtained in the examples and the comparative examples were evaluated as follows. Table 1 shows the results.

(1) Measurement of Water Absorption Per Unit Area and Water Absorption Rate

Each of the polyvinyl acetal resins obtained in the examples and the comparative examples was formed into a film having a thickness of 10 μm by a doctor blade method, dried at 70° C. for three hours, and then left to stand in an environment at a temperature of 20° C. and a humidity of 55% for one hour or longer. The weight A of the film was then measured.

Subsequently, a main surface of the film was exposed to warm water vapor having a temperature of 50° C. Exposure to water vapor was terminated when waterdrops appeared on the surface of the film. The weight B of the film was then measured. The water absorption was calculated by subtracting the weight A from the weight B. The water absorption per unit area was calculated by dividing the water absorption by the exposed area.

The exposed area in the examples and the comparative examples herein was 40 cm$^2$.

Further, the time from the start to the termination of the exposure to water vapor (exposure time) was measured. The value of the weight of the film per unit area divided by the exposure time was calculated as the water absorption rate.

(2) Dispersing Property Test (Ferrite Dispersing Property)
(Production of Slurry Composition)

To 50 g of the obtained polyvinyl acetal resin were added 21.4 g of ion-exchanged water, 28 g of ferrite as magnetic material powder, and 0.6 g of glycerol as a plasticizer. After stirring at 1,200 rpm for 1.5 hours using a disperser produced by PRIMIX Corporation, deaeration was performed at 1,000 rpm for 30 minutes using Thinky Mixer produced by Thinky Corporation. Thus, a slurry composition was produced. The ferrite used was Ni—Cu—Zn ferrite.

(Measurement of Particle Size Distribution)

To the obtained slurry composition were added 5 g of ethanol and 5 g of toluene. They were stirred to produce an evaluation solution.

The evaluation solution was then subjected to particle size distribution measurement using a laser diffraction-type particle size distribution analyzer (produced by HORIBA, Ltd., "LA-910") to determine the D50 particle size of the magnetic material powder. The D50 particle size after the solution was left to stand at 23° C. for one week was also measured in the same manner. The rate of change in D50 particle size was calculated and evaluated in accordance with the following criteria.

A: A rate of change of less than 30%
B: A rate of change of 30% or greater and less than 60%
C: A rate of change of 60% or greater and less than 100%
D: A rate of change of 100% or greater (3) Adhesiveness to Substrates
(Production of Resin Sheet)

The obtained polyvinyl acetal resin was applied using a coater to a release-treated PET film to give a dried thickness of 15 μm and dried at 70° C. for 120 minutes to produce a resin sheet.

The obtained resin sheet was applied to various substrates (SPCC, PET, and PC) to give a dried thickness of 20 μm and then dried to provide adhesiveness measurement samples.

The adhesiveness of the obtained measurement samples was evaluated using a cross-cut test specified in JIS K 5400.

(4) Stress at Upper Yield Point, Strain at Break, and Stress at Break
(Sheet Strength)

The stress at the upper yield point (MPa), the strain at break (%), and the stress at break (MPa) of the obtained resin sheet were measured in conformity with JIS K 7113 using a tensile tester (AUTOGRAPH AGS-J produced by Shimadzu Corporation) at a tensile speed of 20 mm/min.

TABLE 1

| | Slurry composition Polyvinyl acetal resin | | | | | | | | Evaluation | | | | | | |
|---|---|---|---|---|---|---|---|---|---|---|---|---|---|---|---|
| | | | | | Hydroxy group | | | | Water | Ferrite dispersing property | | | | Resin sheet evaluation | |
| | Average degree of polymerization | Acetoacetal group content (mol %) | Butyral group content (mol %) | Hydroxy group content (mol %) | Hydroxy group half-width (cm$^{-1}$) | half-width in terms of mol % (mol %/cm$^{-1}$) | Acetyl group content (mol %) | Water absorption (mg/cm$^2$) | absorption rate (mg/cm$^2$·min) | Particle size distribution | Adhesiveness to substrates | | | Stress at upper yield point (MPa) | Stress at break (MPa) | Strain at break (%) |
| | | | | | | | | | | | SPCC | PET | PC | | | |
| Example 1 | 600 | 30.0 | 0 | 58.0 | 315 | 0.184 | 12 | 3.5 | 0.4 | A | 10 | 6 | 4 | 80 | 100 | 260 |
| Example 2 | 600 | 30.0 | 0 | 58.0 | 310 | 0.187 | 12 | 5.0 | 0.5 | A | 10 | 6 | 4 | 70 | 95 | 290 |
| Example 3 | 600 | 3.0 | 0 | 85.0 | 300 | 0.283 | 12 | 10.0 | 1.1 | B | 10 | 4 | 4 | 60 | 80 | 310 |
| Example 4 | 600 | 0.0 | 3.5 | 84.5 | 330 | 0.256 | 12 | 5.0 | 0.6 | C | 10 | 4 | 4 | 100 | 90 | 220 |
| Example 5 | 600 | 43.0 | 0 | 45.0 | 320 | 0.141 | 12 | 2.5 | 0.3 | A | 10 | 8 | 6 | 85 | 105 | 300 |
| Example 6 | 600 | 3.0 | 0 | 87.0 | 290 | 0.293 | 10 | 48.0 | 3.5 | B | 10 | 4 | 4 | 60 | 75 | 230 |
| Example 7 | 4500 | 30.0 | 0 | 60.0 | 310 | 0.194 | 10 | 5.2 | 0.4 | C | 10 | 4 | 4 | 125 | 135 | 350 |
| Example 8 | 600 | 45.0 | 0 | 43.0 | 300 | 0.143 | 12 | 3.2 | 0.3 | B | 10 | 8 | 6 | 80 | 100 | 305 |
| Example 9 | 600 | 30.0 | 0 | 65.0 | 300 | 0.217 | 5 | 12.0 | 1.3 | B | 10 | 6 | 4 | 100 | 90 | 230 |
| Example 10 | 600 | 24.0 | 0 | 58.0 | 300 | 0.193 | 18 | 9.5 | 0.8 | C | 10 | 6 | 4 | 65 | 100 | 300 |
| Comparative Example 1 | 600 | 30.0 | 0 | 58.0 | 275 | 0.211 | 12 | 1.9 | 0.2 | D | 10 | 4 | 4 | 50 | 70 | 200 |
| Comparative Example 2 | 600 | 55.0 | 0 | 33.0 | 280 | 0.118 | 12 | 1.8 | 0.1 | D | 10 | 6 | 6 | 45 | 55 | 170 |
| Comparative Example 3 | 600 | 0.5 | 0 | 87.5 | 270 | 0.324 | 12 | 1.5 | 0.1 | D | 10 | 4 | 4 | 105 | 110 | 30 |
| Comparative Example 4 | 600 | 0.8 | 0 | 91.2 | 310 | 0.294 | 8 | 52.0 | 4.5 | D | 8 | 2 | 2 | 115 | 125 | 10 |
| Comparative Example 5 | 600 | 30.0 | 0 | 60.0 | 425 | 0.141 | 10 | 1.8 | 0.2 | D | 10 | 4 | 4 | 130 | 135 | 105 |

INDUSTRIAL APPLICABILITY

The present invention can provide a polyvinyl acetal resin that has an excellent dispersing property and enables the production of a formed article having high mechanical strength.

The invention claimed is:

1. A polyvinyl acetal resin having a water absorption per unit area of 2 mg/cm$^2$ or greater and 50 mg/cm$^2$ or less when formed into a film having a thickness of 10 μm.

2. The polyvinyl acetal resin according to claim 1, having an average degree of polymerization of 200 to 5,000.

3. The polyvinyl acetal resin according to claim 1, having an acetal group content of 1 to 50 mol %.

4. The polyvinyl acetal resin according to claim 1, which is an acetalized product of a polyvinyl alcohol resin having a degree of saponification of 75 mol % or greater.

5. A slurry composition comprising:
the polyvinyl acetal resin according to claim 1;
magnetic material powder; and
a solvent.

* * * * *